Aug. 13, 1946.  W. H. MARSH ET AL  2,405,589
AUTOMATIC PREDETERMINING DEVICE
Filed Feb. 2, 1943  6 Sheets-Sheet 1
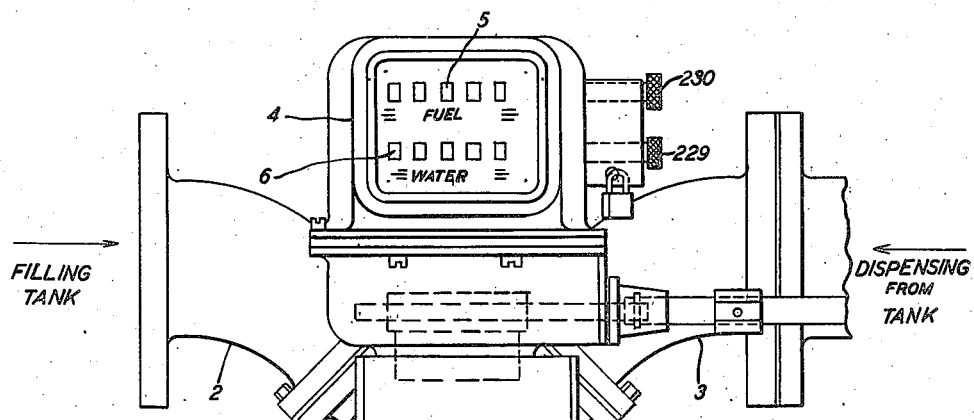
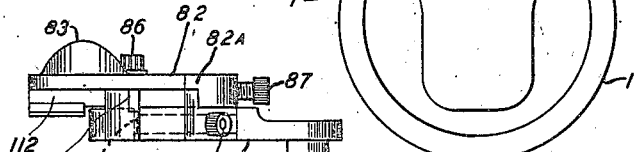
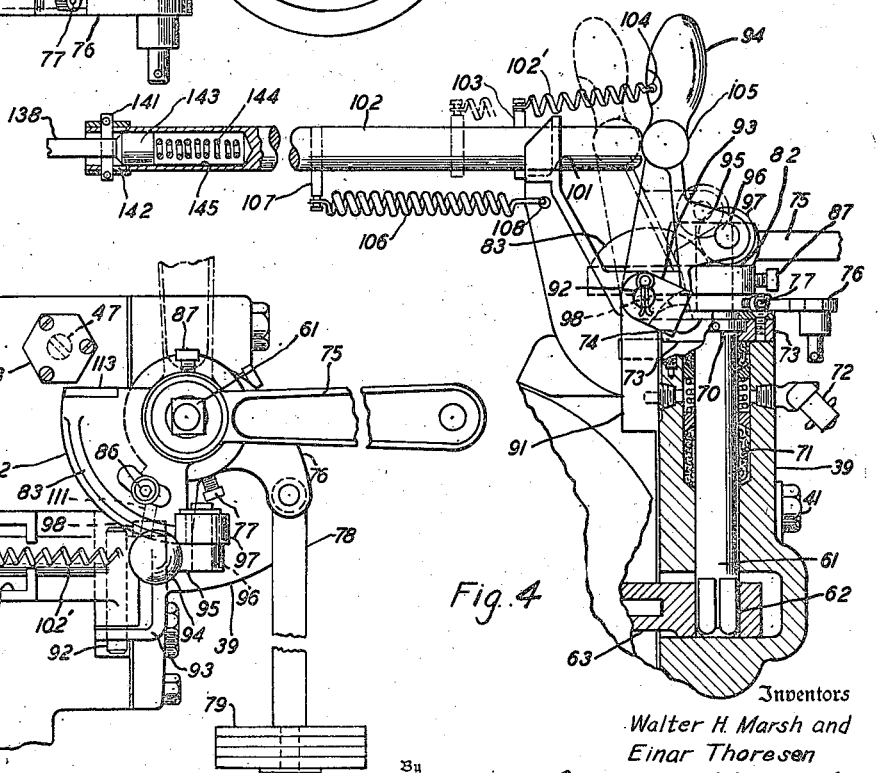
Inventors
Walter H. Marsh and
Einar Thoresen
Attorney Aug. 13, 1946.  W. H. MARSH ET AL  2,405,589
AUTOMATIC PREDETERMINING DEVICE
Filed Feb. 2, 1943  6 Sheets-Sheet 2

Inventors
Walter H. Marsh and
Einar Thoresen
By Lewis D. Konigsberg
Attorney

Aug. 13, 1946.　　　W. H. MARSH ET AL　　　2,405,589
AUTOMATIC PREDETERMINING DEVICE
Filed Feb. 2, 1943　　　6 Sheets-Sheet 4

Inventors
Walter H. Marsh and
Einar Thoresen

Aug. 13, 1946.   W. H. MARSH ET AL   2,405,589
AUTOMATIC PREDETERMINING DEVICE
Filed Feb. 2, 1943   6 Sheets-Sheet 5

Inventors
Walter H. Marsh and
Einar Thoresen
By
Lewis D. Konigsford
Attorney

Aug. 13, 1946.　　　W. H. MARSH ET AL　　　2,405,589
AUTOMATIC PREDETERMINING DEVICE
Filed Feb. 2, 1943　　　6 Sheets-Sheet 6

Inventors
Walter H. Marsh and
Einar Thoresen

Attorney

Patented Aug. 13, 1946

2,405,589

UNITED STATES PATENT OFFICE 2,405,589

AUTOMATIC PREDETERMINING DEVICE

Walter H. Marsh, Crafton, and Einar Thoresen, Pittsburgh, Pa., assignors to Pittsburgh Equitable Meter Company, Pittsburgh, Pa., a corporation of Pennsylvania Application February 2, 1943, Serial No. 474,440

23 Claims. (Cl. 222—14)

The present invention relates to dispensing apparatus for delivering a predetermined quantity of fluid and automatically shutting off the flow of fluid when the desired quantity of fluid has been delivered. This application is a continuation in part of our application Serial No. 309,196 filed December 14, 1939 for Predetermining dispensing apparatus, now United States Letters Patent No. 2,382,454, issued August 14, 1945.

In said application there is described and claimed a predetermining delivery or dispensing apparatus in which a single register operated by a meter in a flow line actuates a valve means in the flow line to first reduce the rate of flow when the predetermined quantity is approached and to shut off the flow when the predetermined quantity has passed through the meter, this action occurring in either direction of flow through the flow line. In the present preferred embodiment a plurality of registers are provided driven by the meter in opposing directions so that when one register is ascending the other is descending, and whichever register is descending actuates the valve means to first reduce the flow and then stop the flow through the flow line. In order to prevent the ascending register from actuating the valve and effecting a reduction in the flow rate we provide detention or restraining means to render inoperative that portion of the valve actuating mechanism which otherwise would cooperate with the ascending register at that time, such detention or restraining means being synchronized with the registers so that when the direction of drive of the registers is reversed and the previously ascending register becomes the descending register the detention means shifts to cooperate with the previously descending register (which now has become the ascending register) and render inoperative that portion of the valve actuating mechanism which cooperates with the now ascending register. The means for synchronizing the restraining means with the operation of the registers is particularly suitable for use in combination in the predetermining system herein described in detail, but it will be understood that certain subcombinations thereof are applicable to other uses.

Accordingly, it is an object of the present invention to provide a predetermining apparatus for a flow line which will cut off the flow when a predetermined quantity has been passed through in either direction of flow.

Another object is the provision of a predetermining apparatus which will cut off the flow when a predetermined quantity has passed in either direction, and which prior to completion of the delivery in either direction will reduce the rate of flow.

Another object is the provision of a predetermining apparatus which will cut off the flow when a predetermined quantity has passed in either direction and which prior to completion of the delivery will reduce the rate of flow, the reduction in rate of flow being accomplished at a predetermined time prior to completion of the delivery regardless of the direction of flow.

Another object is the provision of a reversing mechanism particularly applicable for use in conjunction with a predetermining mechanism.

Another object is the provision of a predetermining mechanism having a plurality of flow stopping mechanisms and an automatically operated reversing mechanism synchronized with the direction of flow for rendering inoperative all except a designated flow stopping mechanism.

Another object is the provision, in a predetermining mechanism having a plurality of registers driven in different directions, of an automatically operated reversing mechanism synchronized with said registers.

The invention will be described in greater detail in connection with the accompanying drawings wherein is shown a preferred embodiment by way of example and wherein:

Figure 1 is a side view of a preferred embodiment of the invention,

Figure 3 is a top view of the valve latch and pilot latch cocking cam,

Figure 8:
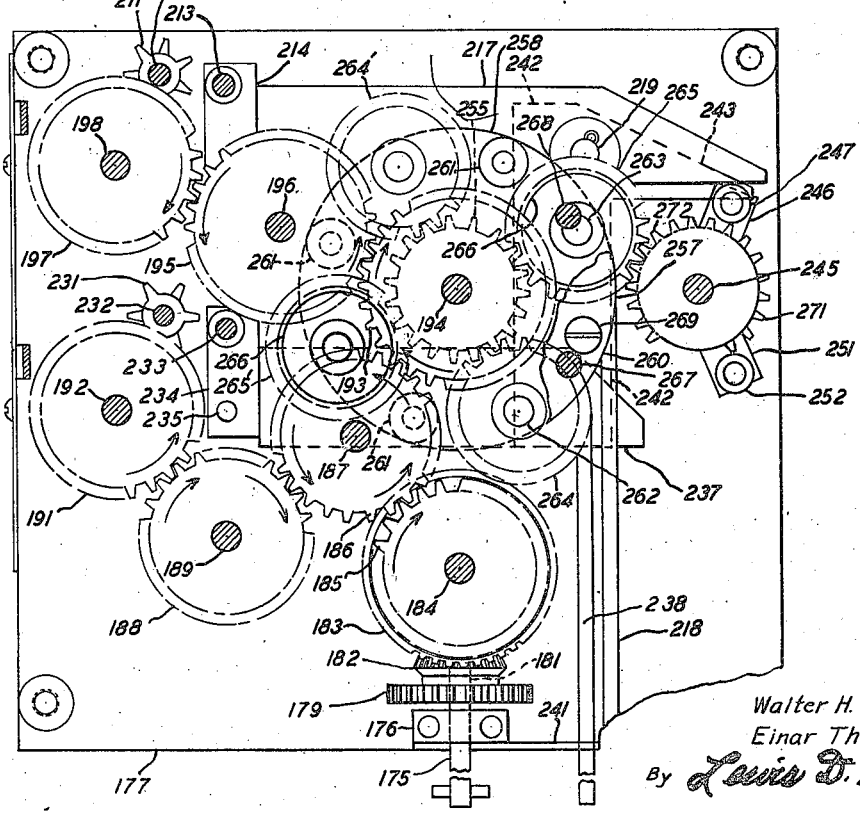
Figure 9:
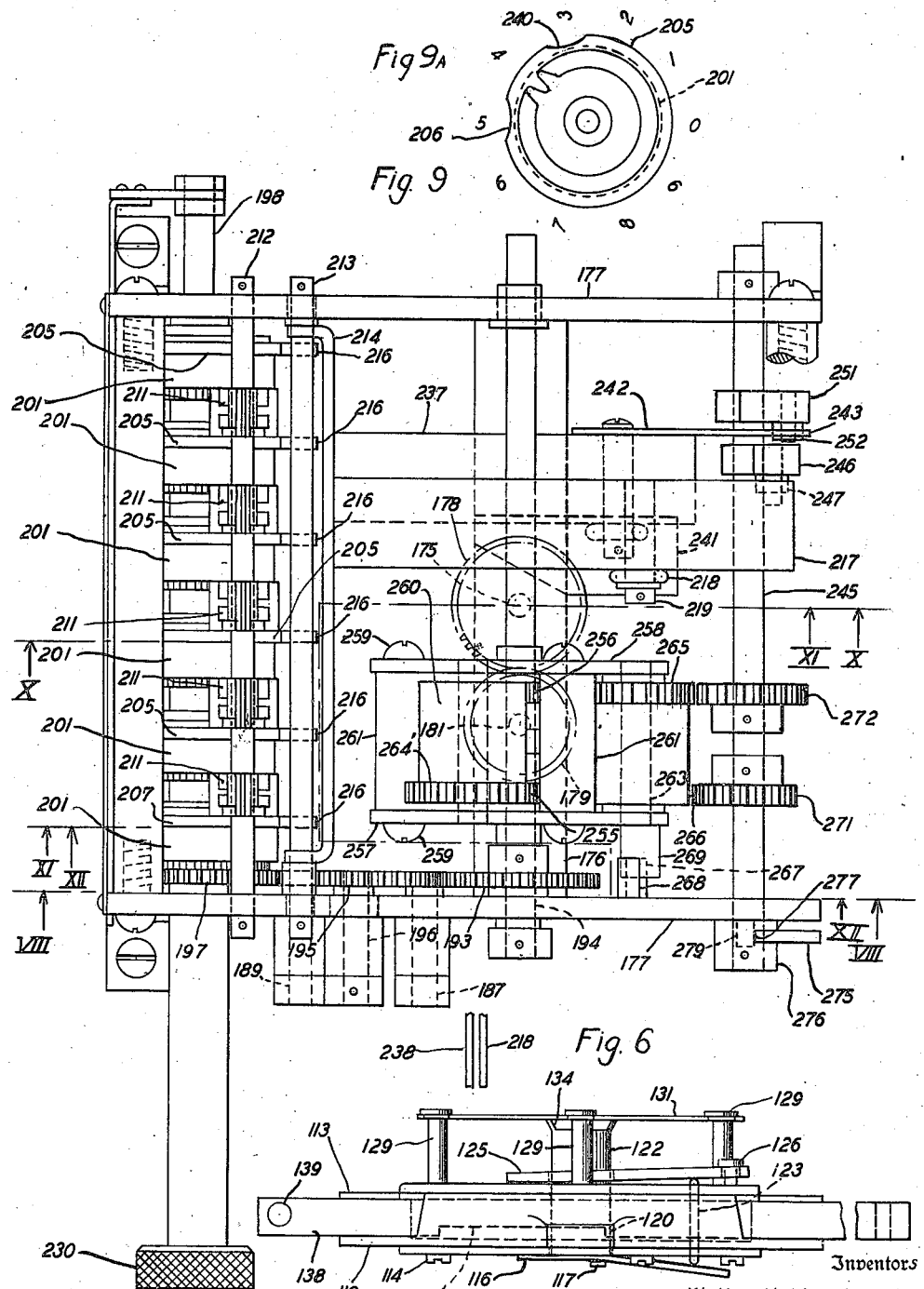
Figure 10:
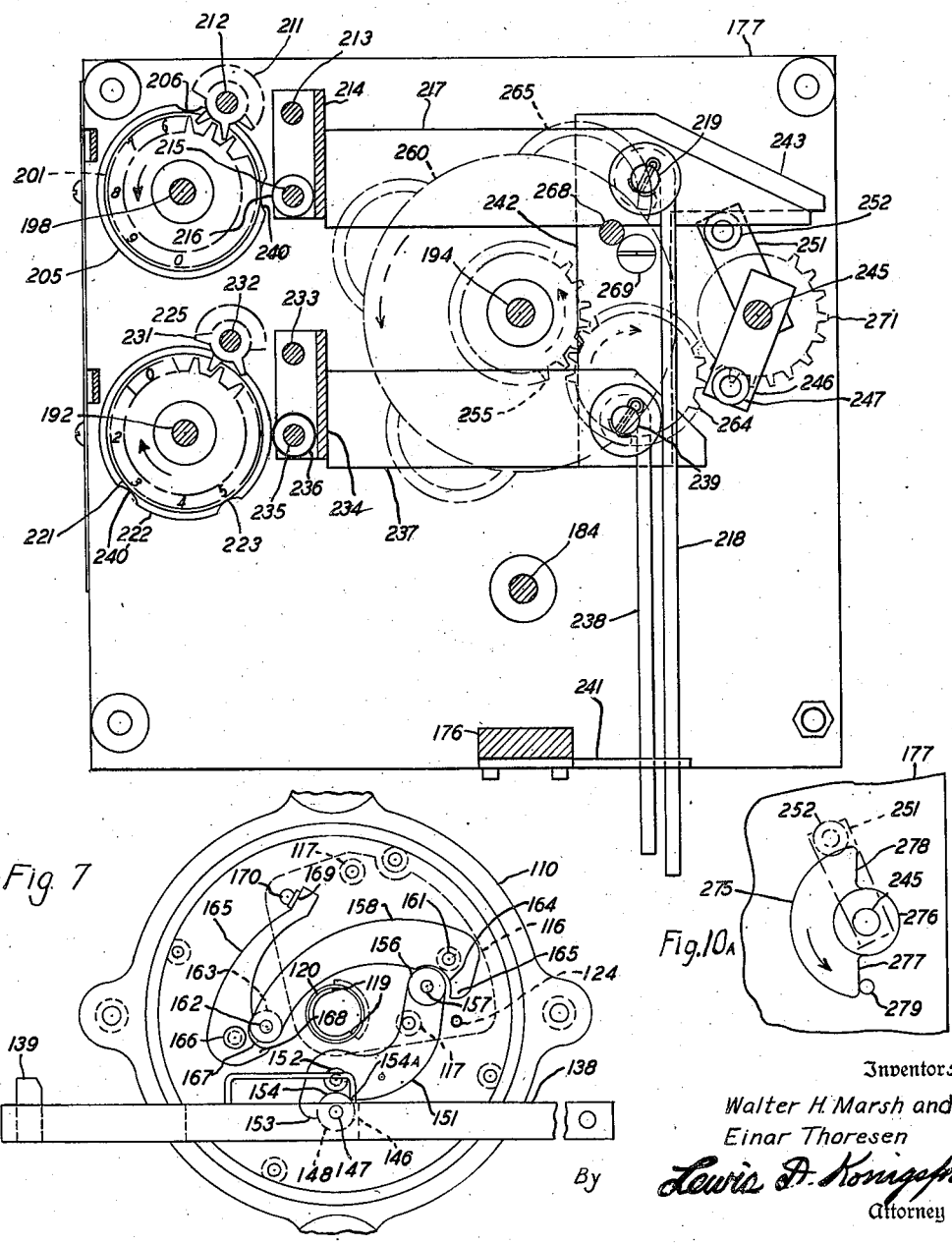
Figure 11:
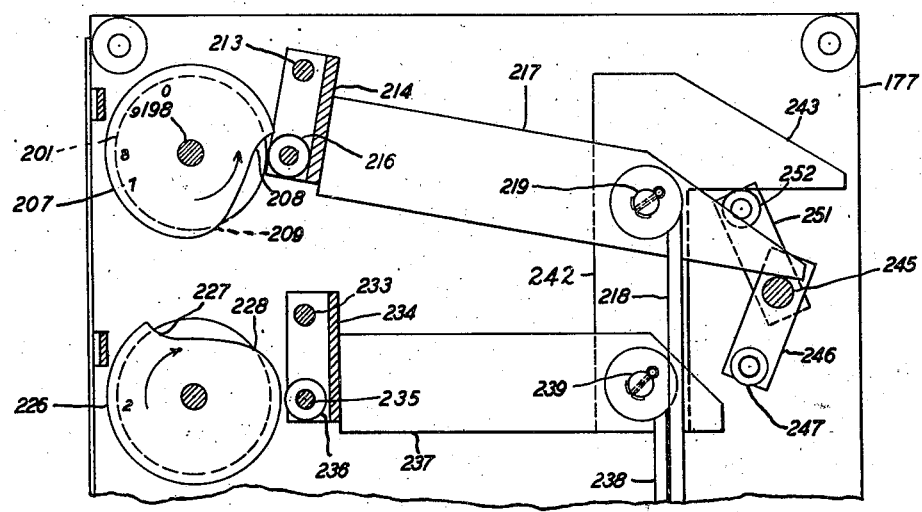
Figure 12:
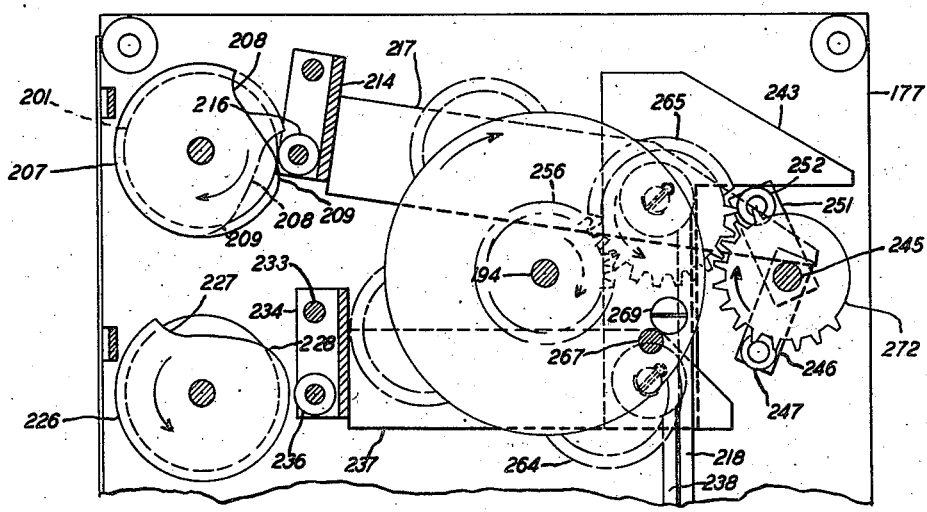
Figure 13:
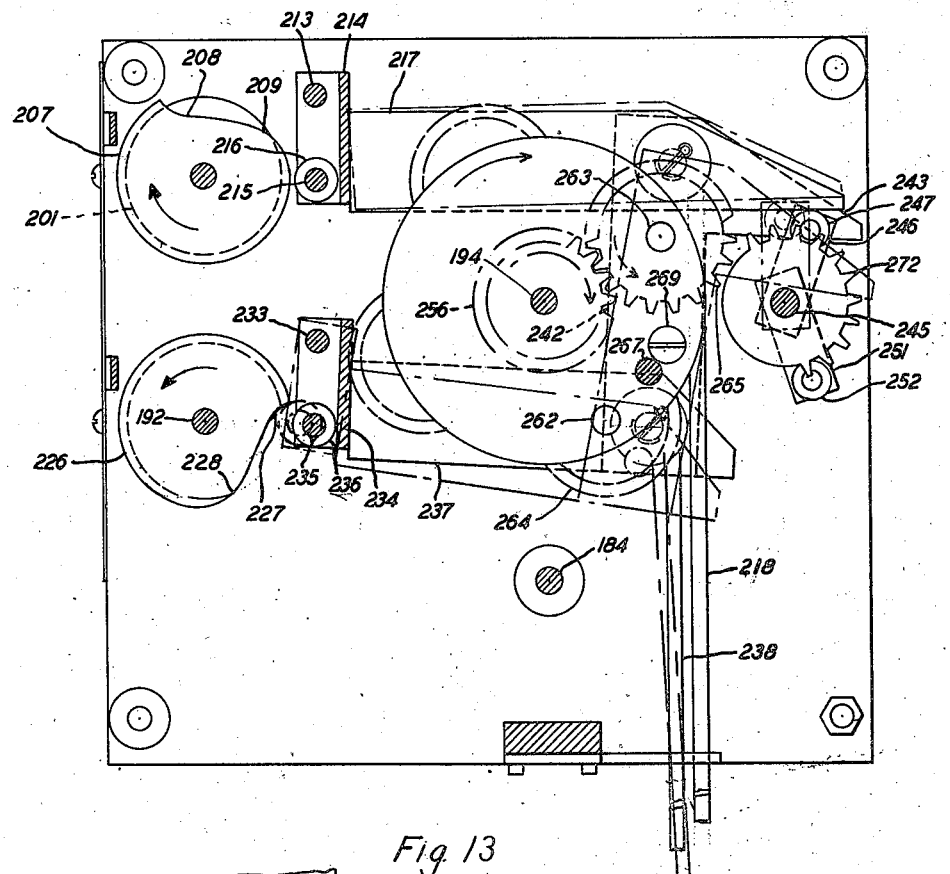
Figure 14:
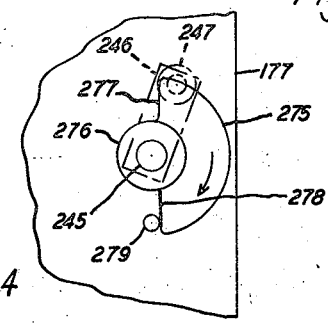

Figure 4 is a side view of the valve and pilot latch cocking cam with parts of the valve casing in section, Figure 5 is an enlarged side view of the valve and pilot latch cocking cam, Figure 6 is a side view of the pilot latch mechanism, Figure 7 is a top view of the pilot latch mechanism with the top of the case removed, Figure 8 is a section taken on line VIII—VIII of Figure 9, with part of one plate of the planetary gear frame broken away, Figure 9 is a top view of the register and predetermining trip mechanism with the outer casing removed, Figure 10 is a vertical sectional view taken on line X—X of Figure 9, showing the upper register at a tripping position, Figure 10a is a side view of a detail in position corresponding to Figure 10, Figure 11 is a vertical sectional view taken on line XI—XI of Figure 9, showing the upper register at a tripping position and the upper weight dropped, Figure 12 is a vertical sectional view similar to Figure 11 showing the positions of the parts at the commencement of the reverse cycle of operation, Figure 13 is a vertical sectional view similar to Figure 11 showing the parts at the end of the reverse cycle with the lower register in tripping position and the lower weight dropped, and Figure 14 is a side view of a detail.

Referring to the drawings (Figure 1) there is shown in outline a fluid flow responsive means such as liquid meter 1 preferably capable of measuring flow in either direction, having connections 2 and 3 which may serve as an inlet or outlet, depending on the direction of flow. The arrows in Figure 1 show the flow of water into the tank during the fuel dispensing operation and the flow of water from the tank during the operation of filling the tank with fuel. The preferred type of meter is that described and claimed in Patent No. 2,274,206, issued February 24, 1942, to Walter H. Marsh.

The register case 4 has an indicator or counter 5 to show the flow of fuel out of the tank and an indicator or counter 6 to show the flow of water into the tank. The housing 7 contains suitable power transmission means between the meter and register.

*Valve*

Figure 2:
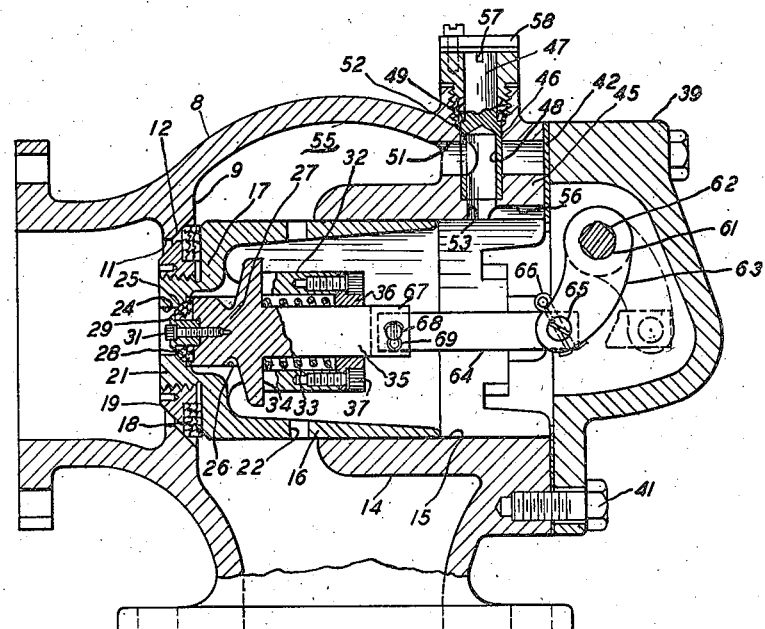
Figure 2 is a vertical sectional view of the valve.

The valve is a modification of that described and claimed in our application, Serial No. 309,-196, filed December 14, 1939, for Predetermining dispensing apparatus, and it is here only briefly described. A valve casing, indicated generally by the numeral 8 (Figure 2) is connected to one side of the meter and has an internal shoulder 9 providing an orifice 11 therethrough, and a tapered seat 12 surrounds the orifice. A valve sleeve or guide 14 is provided preferably integral with the casing and has a core 15 in which is located the sleeve 16 of large valve member 17. Valve member 17 has a washer or the like 18 of relatively soft material such as "neoprene" held thereto by means of a retaining nut 19 threaded on an extension 21 thereof. The sleeve 16 has a plurality of bores 22 therein which in closed position of the valve are uncovered by the guide 14, and in open position of the valve are adapted to be covered by this guide. The valve member 17 has a bore 24 therethrough terminating in an internal tapered valve seat 25. A counter-bore 26 provides a guide to receive a second smaller or pilot valve 27 movable therein and carrying a soft seat member 28 of "neoprene" or the like clamped in place by a flanged bushing 29 and a screw 31. Posts 32 extending from the interior of valve member 17 enclose a spring 33 which at one end engages a shoulder 34 on smaller valve 27 formed where the stem 35 is joined thereto and at the other end engages a bushing 36 held on the post 32 by screws 37 or other suitable means to hold the small valve on its seat. The end of the casing is closed by a cover 39 held thereon by bolts 41 or the like with a gasket 42 interposed between the casing and cover.

An interior boss 45 in the valve casing has a transverse bore 46 in which is rotatably located a throttle pin 47 having a bore 48 therein, the end of the pin extending through a stuffing box 49. A longitudinal bore 51 in the boss registers with the transverse bore 52 in the pin 47, and a passage 53 is provided in the boss 45 which connects with the bore 48. In closed position of the valve, fluid pressure from inlet chamber 55 is transmitted through bores 22 and through bores 51, 52, 48 and 53 to the interior bore 15 of the valve guide and thus tends to maintain the two valves 17 and 27 on their seats. When valve member 17 is opened so that shield 16 covers bores 22 and 53 the pressure from chamber 55 is communicated to the interior of sleeve 16 through passage 56, connecting with bore 53, the holes 22 being closed by the sleeve 14 in this position. The holes 22 provide an additional communication between the chamber 55 and interior of sleeve 16 in closed position to hold the large valve on its seat. The throttle pin 47 has a kerf 57 in its end by which it may be rotated to vary the extent of registration of bores 51 and 52 and thus control the flow therethrough and cover 58 is provided to conceal the end of the pin.

The operating stem 61 (Figures 2 and 4) extends through the cover 39 and at its interior end has a squared portion 62 to receive a bifurcated operating arm 63. A link 64 is received in the bifurcation and is secured in place by a kerfed headed pin 65 and cotter pin 66. The opposite end of link 64 is retained in position by pin 68 and cotter pins 69. The operating stem 61 extends through a stuffing box 71 in the cover of any suitable construction which may be lubricated by a suitable grease fitting 72, the stuffing box being closed by a cap 73 having a projecting plate 74 which engages a flange 70 of the operating stem to prevent its accidental removal. The outer end of the operating stem 61 is squared and carries an operating handle 75 by which the valve may be opened manually and a weight lever 76 suitably held on the stem has a rod 78 pivotally depending therefrom and supporting the weights 79.

A cam 82 (Figures 3, 4 and 5) is secured to the outer end of stem 61 and has a curved cam track 83 extending around its periphery on its upper surface. This cam preferably is made up of two parts comprising the weight lever 76 and a part 82A which carries the cam track, the portion 82A having a hub 84 received in a suitable bore in portion 76 and locked thereto by a set screw 86 in adjusted position and additionally held by set screws 77. Set screws 87 hold the cam assembly on the valve shaft 61.

A bracket 91 is secured to the valve cover and has a pin 92 passing therethrough and through the yoke 93 of pilot latch cocking handle 94, whereby it is pivotally secured to the bracket, and the cocking handle has an extension 95 having a pin 96 secured therein upon which is journalled a roller 97 adapted to operate on the top edge of cam track 83. A quadrant shaped extension or latching piece 98 extends from the yoke into the path of the cam, and is depressed below the plane of cam 82 when handle 94 is at the right. Bracket 91 has an extension having a hole 101 therein providing a guide for a relatively heavy impact rod 102 which is longitudinally movable therein. Spring 102' is secured at one end to a pin 103 in the rod 102 and the other end is fastened in a suitable hole in handle 94, hole 101 being slotted at the top to allow the spring 102' to pass. Thus, spring 102' urges the boss 105 on handle 94 against the end of rod 102 so that the handle and rod are yieldingly constrained to move together. A second spring 106 is secured to a pin 107 in rod 102 and has its other end secured in a hole 108 in bracket 91 whereby rod 102 is biased to the right as seen in Figure 4. The under surface of cam 82 provides a locking edge 111 on the portion 76, and a second locking edge 113 is provided adjacent the surface 112. By adjusting the two parts 76 and 82A the arcuate spacing between edges 111 and 113 may be adjusted. When operating handle 75 is turned counterclockwise, as viewed in Figure 3, against the action of weights 79 (and fluid pressure) to open the valve means, the elevated cam track 83 passes under roller 97, thus pivoting cocking lever 94 to the left about its pivot 92 to the position shown in dot and dash line in Figure 4, and boss 105 on lever 94 pushes rod 102 to the left or potential position against the biasing spring 106, in which position rod 102 is retained by pilot latching mechanism at the register that will be later described. At the same time link 64 connected to arm 63 on stem 61 draws valve 27 to the right against the biasing spring 33 and fluid pressure to open valve orifice 24 and allow a small flow therethrough, this flow coming through openings 22 and through aligned bores 51, 52, 48 and 53. The latching piece 98 now lies under cam 82 in the path of locking edge 111 and if handle 75 is released after cam edge 111 passes latch piece 98 the valve means will be held in partly open position by the engagement of edge 111 with latch piece 98, that is, large valve 17 will remain closed and small valve 27 will be latched or retained thereby in open position. If handle 75 is further rotated in the same direction the sloping face 112 depresses latching piece 98, the spring 102' allowing handle 94 to move away from latched rod 102, until the cam edge 113 has passed the latching piece 98 whereupon the latching piece is elevated by the action of spring 102' into the path of cam edge 113. This further rotation of stem 61 in the meantime compressed spring 33 until large valve 17 opened, the opening of the large valve being facilitated by the relieving of the pressure within sleeve 16 due to opening of the small valve. Now when handle 75 is released the latching piece 98 is engaged by edge 113 and thus prevents return rotation of the cam and stem 61. Thus the large valve 17 becomes latched in fully open position so that flow can now occur directly from chamber 55 through valve orifice 11. In the full open position the guide sleeve 14 covers bore 22 and sleeve 16 covers bore 53, but communication between chamber 55 and the interior of sleeve 16 is maintained through bores 51, 52, 48, 53 and slot 56.

When bar 102 is released by the pilot latching mechanism (which has not yet been described) it strikes boss 105 and pivots lever 94 to the right thus depressing latching piece 98 out of the path of edge 113 to release cam 82 and valve stem 61 for rotation, and large valve 17 starts towards closed position under the influence of the weights 79 and the differential pressure communicated to the inside of sleeve 16 through the passages 51, 52, 48, 53 and 56. By adjusting throttle pin 47 the rate of flow through this bypass into sleeve 16 may be regulated to obtain the desired closing rate of the large valve, and when openings 22 become uncovered near the end of the closing operation, a greater area is thus opened to provide a greater pressure to hold the large valve 27 closed on its seat. In the meantime as cam 82 rotates clockwise the elevated track 83 rides under roller 97 to push lever 94 and rod 102 again to the left where rod 102 is again latched by the pilot latching means located at the register, and spring 102' biases handle 94 and latch piece 98 upward to engage the cam edge 111 and arrest movement of cam 82 and stem 61 with the small valve 27 in the open position to allow a reduced flow through the valve. When bar 102 is again released by the pilot latch the small valve 27 is released and closes by action of spring 33 and fluid pressure to shut off flow through the meter.

*Pilot latch*

The pilot latching mechanism at the register is described and claimed in Patent No. 2,247,139, issued June 24, 1941, to Einar Thoresen and George J. Genung, and now will be briefly described. A cup-shaped latch case 110, (Figures 6 and 7) encloses the pilot latching mechanism and has a cover plate 113 held in place by suitable screws 114. The bottom of the case carries a bent release plate 116 which is pivoted on the line of bend by two headed pins 117, the plate being shown in one extreme position in Figure 6. Release plate 116 has a hole in one corner providing knife edges 119, and a hole 120 in the bottom of the latch case allows the lower end of tube 122 to pass therethrough with its bottom resting on the knife edges 119 which provide bearing edges therefor. A pin 123 passing through holes 124 in the latch case has its lower end resting on the offset right hand side of the release plate and an elongated weight 125 loosely pivoted at one end by headed pins 126 rests on pin 123 thereby holding plate 116 in the position shown in Figure 6. The top plate 113 has four guide posts 129 riveted thereto which have heads at their upper ends and the thin disk or floating plate 131 is held by tube 122, release plate 116, pin 123 and weight 125 in elevated position against the heads of posts 129. Plate 131 has holes loosely fitting the guide posts so that the plate is capable of universal tilting movement about any post. The upper end of tube 122 may be cut away to provide fingers or prongs 134 to act as bearing points.

Case 110 is cut away to receive a slide bar 138 having a stop pin 139 to limit movement thereof to the right. Slide bar 138 is secured to bar 102 (Figure 4) by a pin 141 passing through a slot 142 in the end of bar 102, and a piston 143 in the bore 145 is urged by spring 144 to the left to absorb any shock. Bar 138 is cut out at its bottom, as indicated at 146 (Figure 7) and has a roller 148 journalled on a pin 147 therein. A curved lever 151 pivoted on headed pin 152 is riveted to the bottom of the latch case and has a cocking tail 153 adapted to enter recess 146 in the path of roller 148. Adjacent the tail 153 the lever is cut out at 154 to provide a retaining shoulder 154a. Upon sliding motion of the bar 138 to the left the roller 148 engages tail 153 to pivot lever 151 about the pin 152, and the roller 156 on pin 157 at the other end of the lever engages tail 165 of lever 158 adjacent the arcuate notch 164 to pivot this lever about its fulcrum pin 161, and in turn roller 163 on pin 162 engages tail 168 adjacent arcuate notch 167 of lever 165 to pivot this lever about its fulcrum 166. A detent pin 170 is riveted or otherwise secured to one corner of release plate 116 and extends with a loose fit through a suitable hole in the bottom of the latch case into the path of lever 165. This pin has a flat side portion at its end adapted to engage the end 169 of lever 165, and the opposite side of the pin is cut on a bevel.

When bars 102 and 138 are moved to the left by operation of cocking handle 94, or of operating handle 75 as previously described, roller 148 (Figure 7) engages tail 153 to rotate lever 151 clockwise and roller 156 engages tail 165 to rotate lever 158 counterclockwise while roller 163 engages tail 168 to rotate lever 165 clockwise until the end 169 engages the bevel surface of pin 170 depressing it to allow the lever 165 to pass thereover, and immediately pin 170 is elevated into the path of lever 165 by the action of weight 125 and pin 123 against plate 116 to prevent reverse movement of this lever. Movement of bars 138 and 102 to the right thus is prevented by roller 148 engaging the shoulder 154a which biases lever 151 counterclockwise to bring roller 156 into engagement with arcuate notch 154 and biases lever 158 clockwise while roller 163 engaging notch 167 biases lever 165 counterclockwise against retaining pin 170.

Tripping of the pilot latch is accomplished by depressing plate 131 (Figure 6) which depresses tube 122 and pivot plate 116 to depress pin 170 out of the path of the end of lever 165. This allows sufficient rotation of the various levers to bring the retaining shoulder 154a out of the path of roller 148 to release bar 138, and bar 138 moves to the right under action of spring 106.

*Predetermining register*

A vertical shaft 175 (Figs. 8 and 9) driven by the meter is journalled in a suitable bushing in cross bar 176 secured between the side plates 177 of the register frame, and carries a spur gear 178 meshing with a similar spur gear 179 on shaft 181. Shaft 181 carries a bevel gear 182 meshing with a bevel gear 183 on shaft 184, and a spur gear 185 is secured to this shaft and is thus rotated by drive shaft 175. Gear 185 meshes with gear 186 on shaft 187 which in turn meshes with gear 188 on shaft 189 which in turn meshes with the lower register driving gear 191 on register shaft 192. Gear 186 also meshes with a gear 193 on shaft 194 which in turn meshes with a gear 195 on shaft 196 which in turn meshes with the upper register driving gear 197 on upper register shaft 198. It will be noticed that the register gears 191 and 197 are thus driven in opposite directions.

In each of the registers shown, the first driven numeral wheel represents fractional units, for example, gallons, and the last wheel represents ten thousands. As the upper and lower registers are of like construction only the upper one will be described in detail. It comprises a plurality of numeral wheels 201 (Figure 9) each, with exceptions hereinafter pointed out, having a cam 205 with a notch 206 (Figure 9) in its periphery. The first or fractional numeral wheel cam 207 has a notch 208 (Figure 11) which may be located diametrically opposite the zero number and preferably is cut away to provide a shoulder 209. However, I prefer to locate this notch diametrically opposite the numeral eight so that overriding of this wheel will not cause rotation of the units wheel. Preferably the cams of the wheels from the units wheel to the final wheel are of gradually increasing diameter, and transfer pinions 211 on shaft 212 provide for intermittent movement of the series of wheels in geometrical progression in known manner, for example, as described and illustrated in said Patent No. 2,247,- 139. The lower register is of similar construction and has its plurality of numeral wheels 221, (Fig. 10) each, except as hereinafter described, carrying a cam 222 with a notch 223 in its periphery, diametrically opposite the zero on the numeral wheel and transfer pinions 231 on shaft 232 provide for intermittent movement of the series of wheels in geometrical progression. The first or fractional wheel cam 226 (Fig. 11) has a modified notch 227 diametrically opposite the eight and the cam is cut away to provide a shoulder 228 on the opposite side from the side of notch 208 that is cut away. The numeral wheels of the registers may be set individually by means of notches in slidable register shafts 192 and 198 cooperating with internal pawls in the register wheels, and as the direction of rotation of the lower register is reverse to that of the upper register the internal ratchets of the lower register are reverse from those in the upper register. This construction is disclosed in Patent 2,247,139 and need not be illustrated here. The register wheels are set individually by grasping the knobs 229 or 230 (Figs. 1 and 9) on shafts 192 or 198, positioning the shafts longitudinally, and rotating the shafts.

A shaft 213, (Figs. 9 and 10) carries a yoke 214 in which is secured a roller shaft 215 upon which are journalled the rollers 216, one roller being provided for each cam 205 and for cam 207. A weight 217 is suitably secured to yoke 214 and adjacent its outer end carries a rod 218 depending from a pivot pin 219. A shaft 233 carries a yoke 234 in which is secured a roller shaft 235 and rollers 236 are journalled thereon, one roller being provided for each cam 222 and 226. A weight 237 is suitably secured to yoke 234 and adjacent its outer end carries a rod 238 depending from a pivot pin 239. A guide 241 (Figs. 9 and 10) is secured to bottom bar 176 to guide rods 218 and 238 for vertical movement.

The operation of the apparatus so far described now will be explained. Referring to Figure 8, when the lower register is driven in the direction indicated by the arrow, it will be rotated by gears 185, 186, 188 and 191 until all the notches 223 (Fig. 10), and the first notch 227 (Figure 13) are in alignment, whereupon rollers 236 fall into the notches and thus allow yoke 234 to pivot and depress rod 238 and thus depress trip plate 131 (Fig. 6) to actuate the pilot latch mechanism, and release bar 138. When the upper register is driven in predetermining direction (which is opposite the arrows of Fig. 8) and all the notches 206 and first notch 208 are in alignment (Fig. 11) the rollers 216 are allowed to fall into the notches and thus allow yoke 214 to pivot about its pivot 213 and drop weight 217 carrying down rod 218 to depress pilot latch plate 131 (Fig. 6) and thus release bar 138. Thus it will be seen that whichever counter is rotating in descending direction trips the pilot latch mechanism when zero is indicated thereon. The mechanism thus far described therefore may be employed to release the predetermining valve at zero when the predetermined quantity of fluid passes through the meter in either direction. Or by suitable location of the notch or notches in the cams of each counter or of one counter only it may be employed in a recycling operation to actuate the valve repeatedly when a predetermined quantity flows through the meter in one direction.

The mechanism for pretripping the valve means prior to completion of the final dispensing operation now will be described.

Cam 205 of the tens numeral wheel of the upper counter has an additional notch 240 (Fig. 9a) which may be called a pretripping notch and serves, when aligned with the notches 206 of the other wheels and notch 208 of the first wheel, to trip the pilot latch mechanism at a point prior to the tripping action of final notch 206 in the tens wheel. Thus, where the presetting notch 240 is diametrically opposite the eight on the tens wheel, pretripping will occur when the upper counter reads eighty. This notch may be located at any position on the tens wheel, or at any position on any other wheel as desired, and will serve to pretrip the pilot latch, and the pilot latch in turn trips the valve latch and allows the large valve to close, while the small valve remains open, and the pilot latch is recocked as previously described, until the final notch 206 of the tens wheel aligns with the notches 206 of the other wheels and notch 208 of the first wheel to again trip the pilot latch and release the small valve. The lower counter has a similar pretripping notch 240' on the tens wheel for a similar purpose, and this pretripping notch also may be located at any position on the tens wheel or on any other wheel in any position as desired. Each counter therefore, when operated in descending direction, will trip the pilot latch at eighty and at zero.

The registers show the contents of the tank, and assuming twenty thousand gallons of fuel are to be dispensed from the tank, the lower or water counter at the beginning of the operation will read zero while the upper or fuel counter will read twenty thousand. Therefore, the water counter may be said to operate as a positive or additive counter, while the fuel counter may be said to operate as a negative or subtractive counter. The fuel is discharged by forcing water into the tank, and when eighty gallons of water have been introduced into the tank (that is, eighty gallons of fuel have been dispensed) the water counter will have ascended to eighty and the fuel counter will have descended to 19,920 at which point the pretripping notch 240' of the ascending water counter would trip the pilot latch unless means were provided to prevent this tripping. And conversely, if the tank is to be filled with fuel, the water counter will read twenty thousand at the commencement of the filling operation, and when eighty gallons of water are discharged from the tank (due to introduction of eighty gallons of fuel) the fuel counter will be at eighty and the water counter will be at 19,920 and thus the pretripping notch 240 of the ascending fuel counter would trip the pilot latch unless means were provided to prevent this tripping action. The water counter now operates as a subtractive or negative counter while the fuel counter operates as an additive or positive counter. This pretripping action when the register is ascending is not desired for certain purposes and I therefore prefer to provide a cut out, shield or guard to prevent this pretripping action except when the register is descending, as will now be described.

A shaft 245 (Figs. 8, 9, 10, and 11 to 13) carries two arms 246 and 251 secured to rotate therewith, and each carries a roller 247 and 252 respectively at its end. In Figures 8, 9 and 13, the arm 246 is shown in its upper position with the roller 247 projecting under and supporting weight 217 to prevent the weight dropping when the presetting notch becomes aligned with the other notches of the upper counter in the ascending operation of the counter. Lower weight 237 carries an extension 242 (Figs. 8 and 11) having a projecting portion 243, and when shaft 245 is rotated to the position shown in Figs. 9 to 12 the arm 251 assumes the upper position with the roller 252 extending under projecting portion 243 and thus supports lower weight 237 to prevent it dropping when the presetting notch becomes aligned with the other notches of the lower counter in the ascending operation of the counter. The positioning of the arms 246 and 251 is synchronized with the counters so that each time the direction of operation of the meter changes the proper arm moves under the weight of the ascending counter to prevent that counter from tripping the pilot latch when the presetting notch thereof becomes aligned with the other notches of that counter, and this synchronizing means now will be described.

Shaft 194 (Fig. 9) carries a pair of sun gears 255 and 256 secured thereon to rotate with the shaft. The shaft also carries a frame 260 comprising side plates 257 and 258 secured together by screws 259 and spacers 261, this frame being journalled to idle upon shaft 194. Journalled on suitable shafts 262 and 263, mounted in the frame 260 (Fig. 8) are a pair of gears 264 and 265 which are in mesh with the sun gears 255 and 256 respectively. The rotating frame structure 260 and planetary gears carried thereon is made rather heavy and to increase the weight of this structure the gears 264 and 265 are cut from bar stock allowing a cylindrical drum or hub 266 to extend therefrom and in order to counterbalance the weight of these gears additional idler gears 264' and 265' are provided diametrically opposite gears 264 and 265 and in mesh with the respective sun gears. External stops 267 and 268 (Figs. 8 and 9) are provided extending inwardly from the register side plate 177 and located to engage an extension 269 projecting from the side plate 257 of the rotary frame. A segmental stop member 275 (Figs. 9 and 14) on a hub 276 is secured to shaft 245 and has two edges 277 and 278 that cooperate with a pin or stop 279 in the register side plate 177 to limit rotation of shaft 245 to about 180°. Shaft 245 carries two segmental gears 271 and 272 (Fig. 9) disposed in a certain relation to arms 246 and 252 and stop member 275.

The operation of the apparatus now will be described. Commencing with the parts in position shown in Figure 10, the upper counter is operating in descending direction and the sun gear 255 on shaft 194 is rotating counterclockwise and by its engagement with the planetary gears it biases the frame 260 in a counterclockwise direction with stop pin 269 on the planetary frame against upper stop pin 268. In this position upper planetary gear 265 is separated from and is out of mesh with segmental gear 272 while lower planetary gear 264 is adjacent segmental gear 271 weight 237 having rotated arm 251 and shaft 245 beyond dead center until edge 277 of stop member 275 (Fig. 10a) was brought into engagement with stop pin 279 thus arresting further rotation of shaft 245 so that roller 252 on arm 251 is supporting weight 237, and segmental gear 271 is held with its last tooth out of mesh with planetary gear 264. When eighty is reached on the upper register in descending direction the presetting notch 240 (Fig. 10) becomes aligned with the other notches 206 of the higher numeral wheels and when fractional wheel 201 reaches the eight position the notch 208 thereof becomes aligned (Fig. 11) and rollers 216 enter the aligned notches and allow weight 217 to drop while lower weight 237 remains elevated. Rod 218 descending with weight 217 depresses plate 131 (Fig. 6) to release bars 138 and 192 (Fig. 4) and under the bias of spring 106 the bar 102 rocks cocking handle 94 to the right to depress latching piece 98 out of the path of cam edge 113 whereby the cam and shaft 61 are released for rotation to allow the large valve (Fig. 2) to commence its closing operation. The rotation of the cam causes cam edge 83 (Fig. 4) to pass under roller 97 and thus cocking lever 94 is forced to the left to move bars 102 and 138 to the left while latching piece 98 rises into the path of cam edge 111 to stop further rotation of shaft 61 and thus retain pilot valve 37 in open position. The rate of closing of the large valve may be regulated by adjustment of throttle pin 47 and by adjusting the two parts 76 and 82A of the cam the angular distance between the locking edges 113 and 111 may be varied. Meanwhile, upon continued rotation of shaft 194 (Fig. 11) the fractional wheel cam 207 continues to rotate until the 209 of notch 208 engages a roller 216 and raises the weight 217 thereby elevating rod 218 away from plate 131 (Fig. 6) to allow the pilot latch mechanism to relatch bar 138. The weight 217 continues to be held elevated until the zero position of all the wheels is reached where all the notches 206 are aligned and the eight position of the fractional wheel is reached where cam notch 208 is aligned therewith whereupon weight 217 and rod 218 are again allowed to drop and trip the pilot latch to release bars 138 and 102 as previously described. Again cocking handle 94 (Fig. 4) is forced by bar 102 to the right to bring latch piece 98 out of the path of cam edge 111 to release the cam and shaft 61 for turning so that pilot valve 37 can close, the large valve 17 meanwhile having reached closed position. The lag between release of the pilot valve and complete shutting off of the flow is compensated for by having the fractional cam notch 208 opposite the eight so that by the time complete shut-off occurs the fractional wheel of the upper register will have moved around to the position shown in Figure 12.

Now, when the direction of rotation of the meter is reversed so that the lower register commences to move in descending direction gears 185, 186, and 193 (Fig. 8) rotate shaft 194 clockwise and sun gear 256 engaging gear 265 rotates the planetary frame 260 clockwise to move planetary gear 264 out of the path of segmental gear 271 and bring planetary gear 265 into mesh with segmental gear 272 as shown in Figure 12, at which point further rotation of frame 260 is arrested by lower stop pin 267 engaging pin 269, and planetary gear 265 begins to rotate. The meshing of gears 265 and 272 causes gear 272 and shaft 245 to rotate thus moving arm and roller 252 away from extension 243 and bringing arm and roller 247 under weight 217 to lift weight 217 until just beyond dead center as shown in dot and dash lines in Fig. 13, whereupon the weight 217 rotates arm 246 and shaft 245 slightly to the full line position which moves the last tooth of segmental gear 272 out of mesh with planetary gear 265 as in Figure 13, in which position shaft 245 is stopped by the engagement of edge 278 against pin 279 as shown in Figure 14. In the meantime the upper fractional wheel cam 207 has been rotated from the full line position shown in Figure 12 to the broken line position. That is, the reversal of arms 246 and 251 and rotation of segmental gears 271 and 272 occurs while cam 207 is moving from the full line to the dotted line position. It now will be apparent that the cut away part of notch 208 allows the cam 207 to rotate without interference from roller 216, whereas if notch 208 were not cut away the roller in this notch might lock the register against rotation. Weight 237 now is free to drop while upper weight 217 is supported by roller 247 on arm 246. When the lower register descends to 19,920 the upper register will be at eighty, which is a pretripping position, but tripping of the pilot latch in this position will not occur because the upper weight is held supported by roller 247. When the lower register descends to eighty the pretripping notch 240' thereof becomes aligned with the notches 223 of the higher wheels and when the fractional wheel cam reaches eight the notches are all aligned and the lower weight is allowed to fall as shown in Figure 13 in broken lines to trip the pilot latch and release the large valve as previously described. The lower weight is then raised by notch shoulder 229 as the lower register continues to rotate until the zero position is reached on the tens wheel and the fractional wheel reaches eight whereupon the lower weight is allowed to drop to trip the pilot latch and close the small valve as previously described in connection with the upper counter.

It will be understood that the invention is not limited to the provision of large and small or pilot valve means, for where the rate of flow is small enough the pilot valve may be omitted. Or, by suitably locating the presetting notch or employing more than one presetting notch the apparatus may be employed to dispense a succession of equal or unequal predetermined quantities, and for this purpose any desired number of locking edges may be employed on the valve latching cam in conjunction with a suitably modified cam having peaks between such edges. Also, if desired, the pilot latch may be employed to directly hold the valve means open, thus omitting the valve latch cam. Various other modifications may be made in the invention, and accordingly the above description is intended to be illustrative merely.

What we claim as our invention and desire to secure by Letters Patent is:

1. In a predetermining dispensing apparatus, a fluid flow responsive device operable by flow of fluid therethrough in either direction, a single valve means controlling flow of fluid in both directions, a valve latching mechanism, a pair of valve latch tripping means driven by said device, and means operatively controlled by said device for selectively rendering one or the other of the said valve latch tripping means inoperative depending on the direction of flow of fluid through the device to allow one tripping means to be operative.

2. In a predetermining dispensing apparatus, a fluid flow responsive device reversibly operable by fluid flow in opposite directions, valve means controlling fluid flow, a valve tripping mechanism, a plurality of predetermining means driven by said device for actuating said valve tripping mechanism, restraining means for rendering all but one of said predetermining means inoperative, and means actuated by said meter for positioning said restraining means whereby one predetermining means is rendered operative when said device is operated in one direction and is rendered inoperative when said device is operated in the opposite direction.

3. In a predetermining dispensing apparatus a reversibly operable fluid flow responsive device, a valve tripping mechanism, predetermining means controlled by said device and operable in one position thereof to actuate said valve tripping mechanism, relatively movable restraining means for restraining said predetermining means in said position, and means operatively connected with and positioned by said device when operated in one direction for placing said restraining means out of restraining position and for placing said restraining means into restraining position when said device is operated in the opposite direction.

4. In a predetermining dispensing apparatus, a fluid flow responsive device, a plurality of trains of predetermining cams operatively connected with and driven by said device, and the cams in each train having notches adapted to become aligned when a predetermined final quantity of fluid has passed through said device, a valve tripping mechanism, one cam of each train having a presetting notch, a corresponding plurality of sets of feelers independently operable to actuate said tripping mechanism, each set of feelers adapted to cooperate with one train of cams when all the cam notches in said train are aligned to actuate said valve tripping mechanism, means biasing said sets of feelers toward said cams, relatively movable restraining means for each set of feelers, and means driven by said device operatively connected with said restraining means to position the same selectively in cooperative relation to one set of feelers and prevent actuation of the valve tripping mechanism thereby.

5. In combination, a latch mechanism, a trip mechanism, a shaft, means operated by said shaft to render said trip mechanism inoperative, a gear on said shaft, a second gear on said shaft, a frame carrying a pair of shiftable gears adapted to be moved into and out of meshing relation to said first mentioned gears respectively, a second trip member, predetermining means to release said second trip member for tripping said latch mechanism, a second means operated by said shaft adapted to cooperate with said second trip member, means shifting said frame in one direction to bring one of said pair of gears into meshing relation with said first gear, means for rotating said meshing shiftable gear to move said first means out of restraining position and said second restraining means into restraining position for said second trip member, means to disengage said first gear from said shiftable gear, means to move said second gear into the path of said other shiftable gear, and means for shifting said frame in the opposite direction to bring said other shiftable gear into mesh with said second gear.

6. In combination, a shaft, a plurality of arms on said shaft, a gear on said shaft, a second gear on said shaft, a frame carrying a pair of shiftable gears adapted to be moved into and out of meshing relation to said first mentioned gears respectively, means shifting said frame in one direction to bring one of said pair of gears into meshing relation with said first gear, means for rotating said meshing shiftable gear, means to disengage said first gear from said shiftable gear, means to move said second gear into the path of said other shiftable gear, and means for shifting said frame in the opposite direction to bring said other shiftable gear into mesh with said second gear.

7. In combination, a latch mechanism, a trip mechanism, a shaft, means operated by said shaft to render said trip mechanism inoperative, a gear on said shaft, a second gear on said shaft, a frame carrying a pair of shiftable gears adapted to be moved into and out of meshing relation to said first mentioned gears respectively, a second trip member, a second means operated by said shaft adapted to cooperate with said second trip member, means shifting said frame in one direction to bring one of said pair of gears into meshing relation with said first gear, means for rotating said meshing shiftable gear to move said first means out of restraining position and said second restraining means into restraining position for said second trip member, means to disengage said first gear from said shiftable gear, means to move said second gear into the path of said other shiftable gear, and means for shifting said frame in the opposite direction to bring said other shiftable gear into mesh with said second gear.

8. In combination, a latch mechanism, a trip mechanism, a shaft, means operated by said shaft to render said trip mechanism inoperative, a gear on said shaft, a shiftable gear movable into and out of meshing relation with said first gear, a second gear on said shaft, a second shiftable gear movable into and out of meshing relation with said second gear, a second trip member, a second means operated by said shaft adapted to cooperate with said trip member, means rotating said first shiftable gear when in mesh with said first gear to rotate said shaft and move said first means out of restraining position for the first trip mechanism and said second means into restraining position for the second trip member, means to disengage said first gear from the first shiftable gear and move said second gear into the path of the second shiftable gear, and means for actuating said shiftable gears.

9. In combination, a latch mechanism, a trip mechanism, a shaft, an arm secured to said shaft restraining said trip mechanism to render the same inoperative, a segmental gear secured to said shaft, a second shaft adapted to be rotated by a fluid pressure responsive device, a sun gear on said second shaft, a freely rotatable frame journalled on said second shaft and carrying a planetary gear meshing with said sun gear, a second latch trip mechanism, a second arm on said first shaft out of engagement with the second trip mechanism, stop means for said frame to stop rotation thereof when said planetary gear comes into mesh with said segmental gear, whereby said segmental gear is rotated to rotate said first arm away from restraining position of the first trip mechanism and said second arm into restraining position for the second trip mechanism to render the same inoperative, separate predetermining mechanisms for each trip mechanism adapted to be actuated by said device, one of which releases the first trip mechanism to trip said latch when a predetermined quantity flows through said device.

10. In a predetermining mechanism, a latching mechanism, a latch trip mechanism including feeler means, a shaft, an arm secured to said shaft and supporting said latch trip mechanism, a stop limiting movement of said arm, a segmental gear secured to said shaft, a second shaft adapted to be rotated by a fluid flow responsive device, a sun gear on said second shaft, a freely rotatable frame journalled on said second shaft and carrying a planetary gear in mesh with said sun gear, stop means for said frame to stop rotation thereof when said planetary gear comes into mesh with said segmental gear, whereby said segmental gear is rotated to rotate said arm away from supporting position for said latch trip mechanism, a predetermining mechanism adapted to be actuated by said fluid flow device to support said latch trip mechanism after release by said arm, and means cooperating with said feeler means to release said latch trip mechanism to trip said latch mechanism when a predetermined quantity flows through said device.

11. In a predetermining mechanism, a latching mechanism, a latch trip mechanism, a shaft, an arm secured to said shaft and supporting said latch trip mechanism, a stop limiting movement of said arm, a segmental gear secured to said shaft adapted to be rotated by a fluid flow responsive device, a second shaft, a sun gear on said second shaft, a freely rotatable frame journalled on said second shaft and carrying a planetary gear in mesh with said sun gear, stop means for said frame to stop rotation thereof when said planetary gear comes into mesh with said segmental gear, whereby said segmental gear is rotated to rotate said arm away from supporting position for said latch trip mechanism, a predetermining mechanism adapted to be actuated by said fluid flow device to support said latch trip mechanism after release by said arm, and means in said predetermining mechanism to release said latch trip mechanism to trip said latch mechanism when a predetermined quantity flows through said device.

12. In a predetermining apparatus adapted to be actuated by a fluid flow responsive device, a pivoted weight, a shaft, an arm secured to said shaft and supporting said weight, a stop limiting rotation of said arm, a segmental gear secured to said shaft, a second shaft, a freely rotatable frame journalled on said second shaft and carrying a planetary gear, a sun gear on said second shaft meshing with said planetary gear, stop means for said frame to stop rotation thereof when said planetary gear comes into mesh with said segmental gear, whereby said segmental gear is rotated to rotate said arm away from supporting position for said weight, a predetermining mechanism adapted to be actuated by said device to support said weight in released position and allow said weight to drop when a predetermined quantity flows through said device, and latching mechanism adapted to be tripped by said released weight.

13. In combination, a shaft carrying an arm, a segmental gear secured to said shaft, a second shaft, a freely rotatable frame journalled on said second shaft and carrying a planetary gear adapted to mesh with said segmental gear, stop means for said frame to stop rotation thereof when said planetary gear comes into mesh with said segmental gear, whereby said first shaft is rotated to place said arm approximately at dead center position, bias means resting on said arm to move said arm beyond dead center position, and stop means to limit rotation of said first shaft when the segmental gear disengages from the planetary gear, whereby said arm supports said bias means.

14. In combination, a shaft carrying a plurality of arms, a corresponding number of segmental gears secured to said shaft in partially overlapped relation, a second shaft, a freely rotatable frame journalled on said second shaft and carrying a plurality of planetary gears adapted to mesh with said segmental gears respectively, stop means for said frame to stop rotation thereof when a planetary gear comes into mesh with a segmental gear, whereby said first shaft is rotated to place one arm in approximate dead center position, means biasing said arm past dead center, and stop means limiting rotation of said first shaft when the segmental gear disengages from the planetary gear.

15. In combination, a shaft carrying a plurality of arms, a corresponding number of segmental gears secured to said shaft in partially overlapped relation, a second shaft, a freely rotatable frame journalled on said second shaft and carrying a plurality of planetary gears adapted to mesh with said segmental gears respectively, stop means for said frame to stop rotation thereof when a planetary gear comes into mesh with a segmental gear, whereby said first shaft is rotated to place one arm in approximate dead center position, a weight biasing said arm past dead center, and stop means limiting rotation of said first shaft when the segmental gear disengages from the planetary gear, whereby said arm supports said weight.

16. In combination, a shaft, a plurality of arms on said shaft, a gear on said shaft, a shiftable gear movable into and out of meshing relation with said first gear, a second gear on said shaft, a second shiftable gear movable into and out of meshing relation with said second gear, means rotating the first shiftable gear when in mesh with the first gear to rotate said shaft, means to disengage said first gear from said first movable gear and to move said second gear into the path of the second movable gear, and means for actuating said shiftable gears.

17. In a fluid dispensing system in which a first fluid is dispensed from and introduced into a reservoir by the admission to and discharge from said reservoir of a second relatively inert fluid and including a meter operable in reverse directions by the flow of said second fluid to and from said reservoir; a single normally closed valve means controlling the flow of said second fluid to and from said reservoir, means for latching said valve means in open position, and means controlling closure of said valve means to predetermine the amount of said first fluid introduced into or dispensed from said reservoir, said controlling means comprising individual first fluid and second fluid registering devices, and mechanism for operably connecting said devices with the meter to reversibly drive said devices in additive or subtractive registering direction in accordance with the direction of flow of said first fluid past the meter, a separate means operatively controlled by each of said registering devices to actuate said latching means and permit closure of said valve means, and additional means adapted to co-act with each of said latch actuating means independently of the other and prevent latch actuating operation of that one of said means which is associated with the registering device operating in the additively registering direction.

18. The combination defined in claim 17, together with means adapted to be actuated by the meter for operating last named means in timed relation with the operation of said registering devices.

19. The combination defined in claim 17, in which each of said latch actuating means includes a member mounted to be movable into and out of cooperative relation with the associated registering device, and said last named means comprises meter controlled means operable in timed relation with the operation of said registering devices to releasably restrain the respective members against movement in latch actuating direction and retain the same out of cooperative relation with the respective registering devices.

20. The combination defined in claim 17, in which each latch actuating means includes a member movable by gravity in latch actuating direction, and said last named means releasably sustains said member against gravity movement.

21. In a reversible fluid dispensing apparatus embodying a fluid flow responsive measuring device, valve means controlling flow of fluid to be measured by said device and latch means for said valve means; a pair of individual latch tripping means each adapted to coact with said latch means, means actuated by said fluid flow and coacting with said tripping means operable when said fluid flow is in one direction for rendering one of said tripping means inoperable to operate said latch means while permitting the other tripping means to trip said latch means after predetermined fluid flow, and operable when said fluid flow is in the reverse direction for rendering said other tripping means inoperable to operate said latch means while permitting the other tripping means to trip said latch means after predetermined fluid flow.

22. In the apparatus defined in claim 21, said measuring device having two reversely actuated registers each operably associated with one of said tripping means.

23. In a predetermining apparatus having metering means adapted to be actuated by fluid flow in opposite directions and comprising a pair of reversely operable register devices, valve means for controlling flow of fluid past said metering means, valve actuating means, and selector means automatically responsive to the direction of said fluid flow for determining which of said register devices is operable to actuate said valve means and rendering the other of said devices inoperable to actuate said valve means.

WALTER H. MARSH.
EINAR THORESEN.

Certificate of Correction

Patent No. 2,405,589.

August 13, 1946.

WALTER H. MARSH ET AL.

It is hereby certified that error appears in the printed specification of the above numbered patent requiring correction as follows: Column 15, lines 11 and 12, claim 11, strike out "adapted to be rotated by a fluid flow responsive device" and insert the same after "shaft" in line 12, same claim; and that the said Letters Patent should be read with this correction therein that the same may conform to the record of the case in the Patent Office.

Signed and sealed this 29th day of October, A. D. 1946.

[SEAL]

LESLIE FRAZER,
*First Assistant Commissioner of Patents.*